US010101213B2

(12) United States Patent
Pillans

(10) Patent No.: US 10,101,213 B2
(45) Date of Patent: Oct. 16, 2018

(54) THERMAL IMAGING CALIBRATION SYSTEM AND METHOD

(71) Applicant: Leonardo MW Ltd, Basildon (GB)

(72) Inventor: Luke Alexander Pillans, Basildon (GB)

(73) Assignee: LEONARDO MW LTD, Basildon, Essex (GB)

(*) Notice: Subject to any disclaimer, the term of this patent is extended or adjusted under 35 U.S.C. 154(b) by 133 days.

(21) Appl. No.: 15/021,571

(22) PCT Filed: Aug. 12, 2014

(86) PCT No.: PCT/EP2014/067258
§ 371 (c)(1),
(2) Date: Mar. 11, 2016

(87) PCT Pub. No.: WO2015/036192
PCT Pub. Date: Mar. 19, 2015

(65) Prior Publication Data
US 2016/0238454 A1 Aug. 18, 2016

(30) Foreign Application Priority Data

Sep. 16, 2013 (GB) .................. 1316452.0

(51) Int. Cl.
*G01J 5/52* (2006.01)
*G01J 5/08* (2006.01)
(Continued)

(52) U.S. Cl.
CPC ............. *G01J 5/522* (2013.01); *G01J 5/0834* (2013.01); *G01J 5/524* (2013.01); *H04N 5/33* (2013.01);
(Continued)

(58) Field of Classification Search
CPC .......... G01J 5/522; G01J 5/0834; G01J 5/524; G01J 2005/0048; G01J 2005/0077; G01J 2005/526; H04N 5/33
See application file for complete search history.

(56) References Cited

U.S. PATENT DOCUMENTS 5,127,742 A * 7/1992 Fraden .................... G01J 5/524
374/126
8,373,757 B1 * 2/2013 Nguyen ................... H04N 5/33
250/252.1
(Continued)

FOREIGN PATENT DOCUMENTS

DE    10 2007 042268 A1    3/2009

OTHER PUBLICATIONS

International Search Report (PCT/ISA/210) dated Jan. 16, 2015, by the European Patent Office as the International Searching Authority for International Application No. PCT/EP2014/067258.
(Continued)

*Primary Examiner* — Christine S Kim
(74) *Attorney, Agent, or Firm* — Buchanan Ingersoll & Rooney PC

(57) ABSTRACT

A system and method for calibrating an imaging system includes a shutter that is moveable in to the optical path of the imaging system to generate an image of the shutter surface, which is flat and uniform. The shutter can be moved in and out of the optical path between first and second positions. The shutter is heated while in the second position and then returned to the first position. Data sets generated at two different temperatures enable the image generated by the imaging system in normal use to be to be adjusted for responsivity and variation in DC offset of the specific pixel array.

8 Claims, 1 Drawing Sheet

Figure 1:
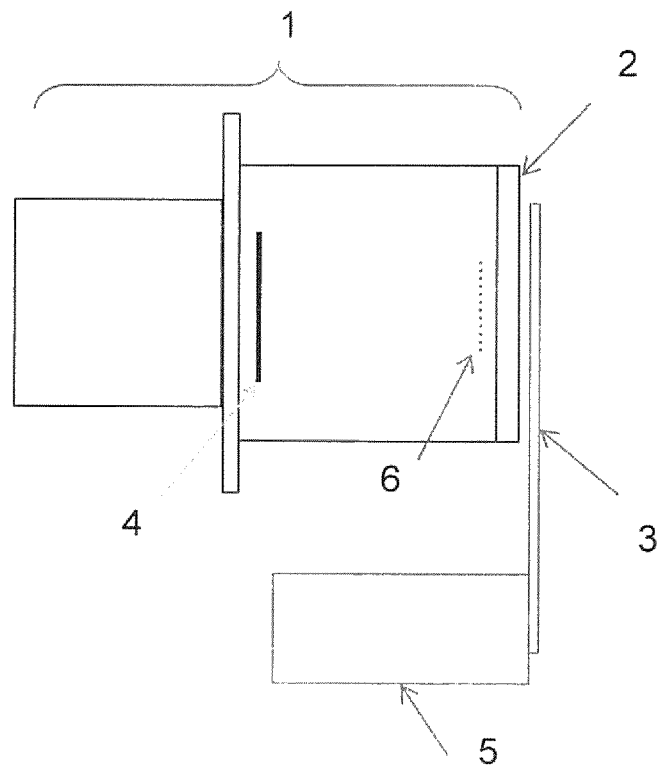

(51) Int. Cl.
*H04N 5/33* (2006.01)
*G01J 5/00* (2006.01)

(52) U.S. Cl.
CPC ............... *G01J 2005/0048* (2013.01); *G01J 2005/0077* (2013.01); *G01J 2005/526* (2013.01)

(56) References Cited

U.S. PATENT DOCUMENTS

| | | |
|---|---|---|
| 2004/0065822 A1 | 4/2004 | Cope |
| 2013/0141590 A1* | 6/2013 | Matsumoto ............. H04N 5/33 348/164 |
| 2014/0198217 A1* | 7/2014 | Johnson ............... H04N 5/2254 348/164 |

OTHER PUBLICATIONS

Written Opinion (PCT/ISA/237) dated Jan. 16, 2015, by the European Patent Office as the International Searching Authority for International Application No. PCT/EP2014/067258.
Williams, G.M. et al.,"Dual-Band MWIR/LWIR Radiometer for Absolute Temperature Measurements", Thermosense XXVIII, vol. 6205, pp. 62050M-1-62050M-13, Apr. 17, 2006 XP007922176.

* cited by examiner

THERMAL IMAGING CALIBRATION SYSTEM AND METHOD

The invention relates to a thermal imaging calibration system and method for Infra-Red (IR) imagers. More specifically but not exclusively it relates to a thermal imaging calibration system and method for 2-dimensional IR Focal Plane Arrays (FPAs) used in thermal imagers.

2D IRFPAs comprising an array of pixels often show significant non-uniformity between pixels. This may be caused by a combination of responsivity non-uniformity and variations in DC offset between pixels. It is common for calibration techniques to be used to correct for these non-uniformities and so improve image quality.

Many calibration techniques are known, most common techniques involve presenting the detector with a notionally flat reference scene, thereby illuminating all pixels with similar flux, and allowing the variation between pixels to be measured. Using reference scenes at two or more flux levels allows measurement of both pixel responsivity variations and DC offset levels. These reference measurements are used to calculate correction parameters for each pixel that are subsequently applied to the output of the detector to improve image quality. The measurement process and the application of the correction are referred to as non-uniformity correction (NUC).

Typically this calibration is performed once during the manufacture of the thermal imager. However, with many detector technologies it is found that pixel uniformity may change over time and performance can be improved by performing further calibrations in situ before or during each session of use.

Methods of in situ calibration are known, ranging from external systems such as pointing the imager at a uniform surface, (e.g. a wall or the ground), covering the lens with a uniform field (e.g. lens cap, card, hand), to systems internal to the camera such as defocusing of optics, or introducing a shutter into the optical path. The use of some form of shutter is preferred for reasons of speed, performance, and simplicity of operation.

A shutter may take several forms such as a flat surface which is moved into the optical path, an iris, or a mirror which directs the view of the detector to a uniform surface within the camera. Most common amongst these methods is placing a flat surface between the detector and the lens.

A shutter may be either temperature controlled (active) or uncontrolled (passive). It is a disadvantage of the passive shutter system that there is no ability to control or change the temperature of the shutter. Therefore, a passive shutter can only present one flux level to the detector, thereby not allowing both responsivity and DC offset levels of individual pixels to be corrected. However, passive shutters are favoured for several reasons, the shutter blade itself can be thinner and lighter allowing faster motion and reducing the gap required between the detector and the lens. Passive shutters also consume less power, weigh less and are cheaper than active shutters. In order to maximise the performance of a thermal imager using a passive shutter, it is common to perform a calibration during manufacture using two or more flux levels to calculate responsivity and DC offset calibration parameters. During subsequent in situ calibration in the field the passive shutter is used only to perform additional DC offset correction. However, with some detector technologies, particularly long wave cooled detectors and higher operating temperature cooled medium wave detectors, substantial changes in pixel responsivity may occur over time and a this method of calibration does not allow optimum performance.

A typical active shutter consists of a thermo-electric cooler (TEC) on a moving arm. The moving arm functions as a heat sink allowing the temperature of the surface of the TEC presented to the detector to be raised or lowered to perform calibration at two or more flux levels. It is a disadvantage of known active shutter systems that interruption of imaging for time periods in the region of 30 seconds may be required.

According to the invention there is provided a system for calibrating an IR detector, the detector comprising an array of pixels in an imaging system, the calibration system comprising a shutter moveable from a first position to a second position, the shutter being disposed in the optical path of the imaging system in the first position and outside of the optical path in the second position, the shutter, when in the second position, being situated adjacent a heat source, the heat source, when operational, heating the shutter to a predetermined temperature, such that the shutter may be moved in to the optical path when in a heated or unheated state thereby enabling two sets of data to be generated, a first set representative of the system at a first temperature and the second set representative of the system at a second temperature.

According to the invention there is further provided a method of calibrating a thermal imaging system comprising a pixel array, the method comprising the steps of: moving a shutter in to the optical path of the imaging system; measuring flat field data relating to the pixel array at a first temperature; removing the shutter from the optical path; positioning the shutter adjacent a heat source for a predetermined time thereby changing the temperature of the shutter to a predetermined second temperature; moving the shutter back in to the optical path of the imaging system; measuring flat field data relating to the pixel array at the second predetermined temperature; and comparing the image taken at the first temperature and the second temperature such that correction for both offset and gain of each pixel is possible.

In this way, the invention provides a system and method having the imaging performance benefits of an active shutter system but with the practical benefits of a passive shutter, namely the high speed of operation, low mass and low cost.

Figure 2:
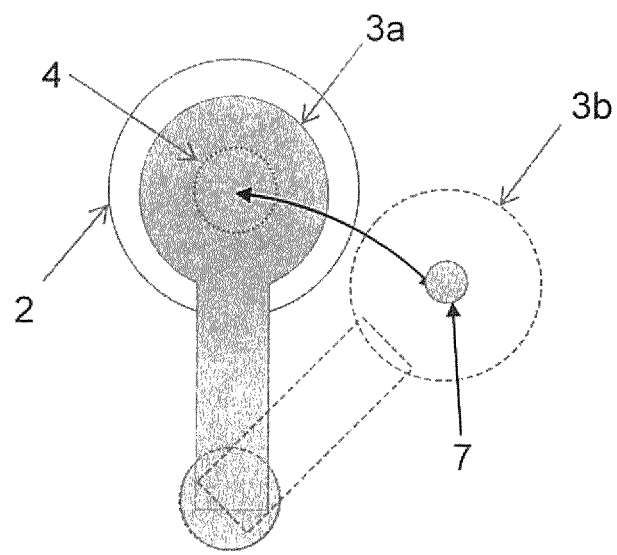

The invention will now be described with reference to the following drawings in which:

FIG. 1 is a diagrammatic side view of an imaging system in accordance with one form of the invention; and FIG. 2 is a diagrammatic front view of the imaging system showing the shutter in a closed position, but also showing, in dotted outline, the position of the shutter when in an open position.

As can be seen from FIGS. 1 and 2, the imaging system comprises an array of pixels forming a Focal Plane Array 4. The imaging system is pointed toward a target (not shown) and an image is acquired at the focal plane array 4. The optical path of the imaging system 1 between the imaging target and the FPA 4 may also include a cold stop aperture 6 and a detector window 2. The calibration system comprises a shutter 3 moveably disposable in the optical path of an imaging system 1. The shutter 3 is preferably disposed between the target and the detector window 2. The shutter 3 moves between two fixed positions 3a and 3b. In position 3a, the shutter 3 is located in the optical path and the image detected is a flat field image of the shutter 3. In position 3b, the shutter 3 is out of the optical path of the imaging system 1. When in position 3b, the shutter 3 may be heated, for example, by a suitable LED 7.

When a calibration of the pixel array is required, the shutter 3 is firstly moved in to position 3a. Flat field data is measured and the shutter 3 is then removed from the optical path and moved to position 3b. The shutter 3 is then heated by the LED 7 for a predetermined time until a suitable surface temperature across the shutter 3 is achieved. The shutter 3 is then moved back to position 3a. Flat field data is then measured again. The two data sets acquired may then be compared and any required adjustments made to the pixel array or correction parameters are generated that are subsequently applied to the image data.

Correction parameters may be calculated in the background whilst imaging continues with the previously stored parameters. Every time new parameters are calculated they may be applied to the image. In this way, the imaging system may be calibrated in situ quickly and efficiently as necessary.

In the method described above, 2 point calibration with two interruptions in imaging of less than 0.5 seconds each may be achieved. Thereby reducing the amount of time the imaging system is not operational.

To allow the use of existing passive shutter designs the system uses a non-contact heating method which does not require any modification to the shutter design. As the system involves a method of heating the shutter 3 in the open position prior to closing the shutter 3, calibration at multiple flux levels is possible whilst requiring no more space between the detector and the lens than a passive shutter 3.

Radiative heating by a suitable commercially available blue LED 7 is chosen in the above example. However, any other suitable heating method may be used. Radiative or inductive heating is preferred over conduction to enable fast heating and reduce stray heating of other components within the imager. However, with suitable modification, a conductive heating method may be used.

In the case where radiative heating is used, a commercial available LED may be chosen as the heating source since it produces very little radiation within the pass band of the detector. LEDs are electrically very efficient and also optically efficient since the incorporated reflector ensures the majority of radiation is directed towards the shutter. The LED is also extremely robust and reliable.

In the above example, the shutter 3 is moved between the two predetermined positions by a suitable shutter motor drive 5. However, any suitable means for moving the shutter between the two positions may be used.

Additionally, in the embodiment described above, the LED 7 is positioned so as to heat the centre of the shutter paddle. However, the LED may be positioned so as to heat any part of the shutter 3. It is important to note, that in no way is the LED 7 in contact with the shutter 3.

Furthermore, the design and operation of the calibration system allows for a shutter 3 that is light and thin. For example, the mass of the shutter 3 may be of the order of 1 g, a 40 g saving in mass over known TEC systems. As the mass of the shutter 3 is reduced, the motor drive 5 required to drive the shutter between the open and closed position may be of a reduced size compared to that for known TEC systems. In the embodiment described above, the mass of the motor is of the order of 20 g compared to 60 g for a TEC system.

Additionally, as a TEC system is no longer required in the imaging system 1 described above, the battery may be smaller and lighter, depending on the operational duration required. The mass of the battery may be reduced by for example between 5 and 50 g.

The calibration system of the invention may also enable a reduction in lens size permitted by smaller back working distance.

A typical TEC system draws approximately 24 W during operation. The system described in the embodiment of the invention described above is of the order of 1 W. Given the short duration of the power demand in both cases it is not a major impact on overall power consumption during an extended period of operation. However, the high instantaneous demand of a TEC places excess load on the batteries reducing the realised efficiency and limiting the choice of battery technologies. Using the invention, it may be practical to run the detector on alkaline or lithium primary batteries. This would not be practical with a TEC since the high instantaneous power requirement would drastically reduce efficiency of the batteries.

The invention claimed is:

1. A system for calibrating an IR detector having an array of pixels in an imaging system, the calibration system comprising:
    a heat source; and
    a shutter moveable from a first position to a second position, the shutter being disposed in an optical path of an imaging system in the first position and outside of the optical path in the second position, the shutter, when in the second position, being situated adjacent the heat source, the heat source, when operational, heating the shutter to a predetermined temperature, such that the shutter may be moved in to the optical path when in a heated or unheated state thereby enabling two sets of data to be generated, a first set representative of the system at a first temperature and the second set representative of the system at a second temperature,
    wherein the heat source is not in contact with the shutter at the second position.

2. A system according to claim 1 wherein the heat source is arranged to heat the shutter by radiation.

3. A system according to claim 1 in which the heat source is an LED.

4. A system according to claim 1 in which a surface of a shutter blade of the shutter is partially reflective thereby allowing the shutter to appear to be at a lower temperature when placed in front of a cooled infrared detector.

5. A system according to claim 1 in which the shutter is moveable between the first and second positions by a motor.

6. A system according to claim 1 in which the first temperature is ambient temperature.

7. An IR thermal imaging camera incorporating the system of claim 1.

8. A method of calibrating a thermal imaging system having a pixel array, the method comprising:
    (a) moving a shutter in an the optical path of the imaging system;
    (b) measuring flat field data relating to the pixel array at a first temperature;
    (c) removing the shutter from the optical path;
    (d) positioning the shutter, when outside the optical path, to be adjacent to and not in contact with a heat source for a predetermined time thereby changing the temperature of the shutter to a predetermined second temperature;
    (e) moving the shutter back in to the optical path of the imaging system;
    (f) measuring flat field data relating to the pixel array at the second predetermined temperature; and (g) comparing images taken at the first temperature and the second temperature for correction of offset and gain of each pixel.

* * * * *